Patented Nov. 12, 1940

2,221,560

UNITED STATES PATENT OFFICE 2,221,560

STABILIZATION OF A ZEIN SOLUTION BY CLARIFICATION

Lloyd C. Swallen, Pekin, Ill., assignor, by mesne assignments, to Corn Products Refining Company, New York, N. Y., a corporation of New Jersey No Drawing. Application July 26, 1937, Serial No. 155,691

20 Claims. (Cl. 134—12)

This invention relates to the production of zein solution; and the object of the invention is to provide certain treatments of the zein particularly when dissolved in aqueous alcohol, whereby its stability in solution will be substantially increased; that is to say, whereby the tendency of the zein in solution to become denatured, that is insoluble, will be, to a large extent, counter-acted, permitting the solution to be kept in a useable state for much more prolonged periods of time than has heretofore been possible.

The invention is based on the discovery that the known tendency for zein in solution to become gradually insoluble in character, so that a solution of zein if left to stand, will become a gel in a relatively brief time, is due to the presence in the solution of insoluble bodies such as denatured zein or other protein substances, which act, probably catalytically, to insolubilize the soluble zein. These insoluble substances are present to some extent in all extracts produced by present methods, and are not removed, or at least completely removed, by the ordinary methods of clarification now used, which are intended merely to separate from the solution particles of gluten meal therein. Zein solutions of this character will set up to a gel more or less rapidly. The time required to set up is dependent on the strength and nature of the alcohol, or other solvent of the zein, the concentration of the solution, the temperature, the hydrogen ion concentration and upon mechanical factors promoting the denaturing operation, such as agitation. But under any given set of conditions the time within which the solution will change to a gel will be very considerably increased by the substantially complete removal from the solution of the insoluble protein which it contains, in accordance with the principles of the present invention.

A practical method of extracting zein from the protein component of maize is to use as a solvent ethyl alcohol of 92%–93% by volume, which may be varied between 88% or lower and 95%, and to carry on the extraction in a rotating drum with an agitator at a temperature of 60° C. (140° F.) for one and a half to two hours. A suitable amount of alkali, say 0.9% sodium hydroxide based on the weight of the gluten meal may be added to the material in the drum. The extracted zein will be in the neighborhood of 6–8 grams to 100 cubic centimeters of the solvent. The meal is then centrifuged and washed with alcohol, giving a zein concentration of 6 grams, per 100 cubic centimeters, which may vary between 5.5 and 7.5 grams, dependent on the strength of the alcohol, the character of the gluten and the proportion of alcohol to gluten meal.

The extract is then treated with a solvent of maize-oil and coloring matter, such as toluol or benzol and oil, coloring matter and their solvent removed. The solution may be used as such; or the zein may be precipitated with water and dried.

A zein extract preferably before treatment for removal of oil and color, obtained in this or other suitable manner (or a solution made by dissolving dried zein in aqueous alcohol or other solvent) is subjected, in accordance with the present invention, to a clarifying operation, or series of clarifying operations under conditions which facilitate the coagulation, precipitation and separation of denatured zein and other protein bodies in the solution without bringing about the precipitation of any substantial amount of soluble zein. These conditions are:

(1) Treatment of the solution at relatively low temperatures. The temperatures should be below 20° C. (68° F.) and preferably below 15° C. 59° F.). It may be 10° C. (50° F.) or even lower, but should be above the point at which the solution separates into two liquid phases; this temperature being dependent on the strength of the alcohol and the zein concentration. Generally speaking, the lower the temperature the sharper and cleaner will be the separation of the insoluble bodies.

(2) The solution should be aged either before or during the separating operation or operations. The ageing may be effected simultaneously with the separating operation by quiescent settling in settling tanks or by the use of a continuous settling system. The ageing period may last from two or three hours to several days.

Preferably the ageing of the solution is effected at the low temperatures indicated above. However, the lower the temperature the less ageing the solution will require and vice versa. If the temperature is reduced to 10° C. (50° F.), or below, the clarification can be effected, without any ageing and by a brief operation, such as centrifuging or filtering.

(3) The concentration of the solution should not be too high otherwise the soluble zein will tend to become denatured more rapidly and the separation of insoluble matter will be hindered. Preferred concentrations are between 5.5 grams and 8 grams of zein in 100 cubic centimeters of the solvent, assuming an aqueous alcohol solvent of the preferred strength indicated above in the description of the extracting process. Generally speaking the lower the concentration the better the clarification; but concentrations as high as practicable should be used in order to avoid the handling of excessive amounts of solution.

(4) The removal of the insoluble protein bodies is facilitated by adsorption treatment of the solution prior to or during the separating operation or operations. This adsorption treatment may be effected by allowing the solution to stand in contact with bone char or treating the solution with activated vegetable carbons or with activated alumina.

(5) The desired clarification may also be facilitated by treating the solution with benzol, toluol, or other maize-oil solvent of a character to be miscible with the zein solution in amounts insufficient to cause separation into two liquid phases.

These different expedients may be used separately or in different combinations one with the other or others; and, generally speaking, the employment of less than all of the expedients, that is one or more, can be compensated for to some extent by intensifying the treatments used; for example, if relatively high temperatures are used in prolongation of the ageing, by the use of adsorbents, etc.

The separation of the insolubles may be accomplished by settling, filtering or centrifuging; or by a combination of these expedients. Preferably settling will form a part of the separating operation because of the ageing effect which it involves. For example, it is convenient to make a preliminary separation by settling, filtering the supernatant liquor and then concentrating the sludge from the settling operation by centrifuging. In filtering operations, on vacuum displacement filters, for example, filter aids should be used to prevent clogging of the filter.

The following examples will illustrate the application of the invention to practice. The crude extract prepared as described above, was submitted to the clarification procedures listed under each specific example. The clarified solution was then worked up by extraction of oil and coloring matter, precipitation with water and drying. The dried zein was then tested for quality by dissolving in three times its weight of 92% ethyl alcohol and ageing the solutions thereby obtained. The stability was judged by the time required for the solutions to attain a viscosity twice the original value. This is an approximate measure of the rate of denaturation of the zein.

For purposes of comparison some of the crude extract was allowed to settle at a temperature of 30°–40° C., (86°–104° F.), merely for the purpose of removal of particles of gluten meal in the solution, but with no effort to remove denatured zein or other protein bodies. The solution (which for brevity will be referred to as the unclarified solution) worked up according to the previously described procedure and the dry zein obtained was tested for stability. The time was relatively short indicating lack of stability.

Example 1

The solution was cooled to 20° C. (68° F.), clarified by centrifuging and settled for two days at a temperature slightly below 20° C. The clear solution was syphoned off. The stability of the zein obtained from this solution was many times the stability of the unclarified solution.

Example 2

The solution was aged for fourteen hours at 30° C. (86° F.) and filtered. The stability of the zein obtained from the clarified solution was not as good as that of Example 1, but considerably better than that of the zein obtained from the unclarified test solution.

Example 3

The solution was aged for fourteen hours at 20° C. (68° F.) and filtered. The stability was considerably better than that of Example 2.

Example 4

The solution was aged for fourteen hours at 10° C. (50° F.) and filtered. The stability was better than Example 3.

Example 5

The solution was aged for two hours at 20° C. (68° F.) and filtered. The stability was increased but was not as good as that of Example 3 or 4.

Example 6

The solution was cooled to 10° C. (50° F.) and filtered at once, without ageing. The stability was good.

Example 7

The solution was treated with 40% of its volume of toluol which was insufficient to bring about stratification of the solution. After ageing for 4.5 hours at 20° C. (68° F.) the solution was filtered. Coagulation and filtration of the precipitate was materially easier than in similar cases where no maize oil solvent was used.

Example 8

The solution was aged for three weeks and then allowed to stand with bone black for two days. The bone black was filtered off and the zein obtained from the solution when tested had good stability.

Example 9

The extract was aged for three weeks and then allowed to stand with activated alumina for two days. The alumina was filtered off, giving a solution which yielded zein having good stability.

It will be understood that reasons of economy and manufacturing convenience will necessarily dictate as to whether all or only some of the above expedients are to be used in actual practice. It is preferable in any case to clarify at reduced temperature and to prolong the operation by settling; but improved results may be obtained by using any of the enumerated expedients, singly or in combination.

It is the intention to cover all equivalent operations and all modifications within the scope of the appended claims.

The clarification of zein solutions by cooling in vacuo is not specifically claimed herein, as such method is the subject matter of applicant's copending application, Serial No. 313,671, filed January 13, 1940.

I claim:

1. Process of treating zein in solution in aqueous alcohol to stabilize the solution which comprises: ageing said solution at a temperature of 15° C. or lower; and removing from the solution insoluble protein bodies which, if allowed to remain, tend to bring about denaturation of the zein, without precipitating any substantial amount of soluble zein.

2. Process of treating zein in solution in aqueous alcohol to stabilize the solution which comprises: subjecting said solution to adsorption treatment; and then removing from the solution insoluble protein bodies which, if allowed to remain, tend to bring about denaturation of the zein, without precipitating any substantial amount of soluble zein.

3. Process of treating zein in solution in aqueous alcohol to stabilize the solution which comprises: mixing with said solution a maize-oil solvent in quantity insufficient to bring about separation into two liquid phases; and then removing from the solution insoluble protein bodies which, if allowed to remain in the solution, tend to bring about denaturation of the zein, without precipitating any substantial amount of soluble zein.

4. Process of treating zein in solution in aqueous alcohol to stabilize the solution which comprises: subjecting said solution to adsorption treatment; and then removing from the solution, by a separating operation at a temperature not substantially in excess of 15° C., insoluble protein bodies which, if allowed to remain in the solution, tend to bring about denaturation of the zein, without precipitating any substantial amount of soluble zein.

5. Process of obtaining a zein alcohol solution of improved stability which comprises: extracting zein from gluten meal with aqueous alcohol; ageing the extract at a temperature below 20° C. for at least 2-3 hours; and removing therefrom all insoluble bodies.

6. Process of treating an aqueous alcohol-zein solution having a concentration of between 5.5 and 8 grams of zein in 100 cubic centimeters of 88%-95% aqueous alcohol to stabilize the solution which comprises: removing from said solution substantially all of the therein contained insoluble protein bodies which, if allowed to remain, tend to bring about denaturation of the zein, without precipitating any substantial amount of soluble zein.

7. Process of treating zein in solution in aqueous alcohol to stabilize the solution which comprises: aging said solution for at least 2-3 hours at a temperature of 20° C. or lower; and removing from the solution precipitated protein bodies which, if allowed to remain, tend to bring about denaturation of the zein.

8. Process of treating an aqueous alcohol-zein solution having a zein concentration of between 5.5 grams and 8 grams of zein in 100 cubic centimeters of 88%-95% ethyl alcohol to stabilize the solution which comprises: aging the solution for at least 2-3 hours at a temperature not in excess of 20° C.; and removing from the solution insoluble protein bodies which, if allowed to remain, tend to bring about denaturation of the zein.

9. Process of treating an unstable zein solution to stabilize it which comprises: precipitating from the zein solution coagulatable protein substance in the form of a filtrable precipitate which substance, if allowed to remain, brings about denaturation of soluble zein; and removing said precipitated substance from the zein solution.

10. Process of treating an aqueous alcohol solution of zein to stabilize it which comprises: precipitating from the zein solution coagulatable protein substance in the form of a filtrable precipitate which substance, if allowed to remain, brings about denaturation of soluble zein; and removing said precipitated substance from the zein solution.

11. Process of stabilizing an unstable zein solution wherein some of the zein is in a denatured state so that if allowed to remain in the solution it will bring about further denaturation of soluble zein, which consists in coagulating and precipitating said denatured zein and removing the precipitate from the solution.

12. Process of treating an unstable zein solution to stabilize it which comprises: ageing the zein solution to precipitate therefrom coagulatable protein substance in the form of a filtrable precipitate which substance, if allowed to remain, brings about denaturation of soluble zein; and removing said precipitated substance from the zein solution.

13. Process of treating an unstable zein solution to stabilize it which comprises: cooling and ageing the zein solution to precipitate therefrom coagulatable protein substance in the form of a filtrable precipitate which substance, if allowed to remain, brings about denaturation of soluble zein; and removing said precipitated substance from the zein solution.

14. Process of preparing a zein solution substantially free from denatured protein substances which tend to bring about denaturation of the soluble zein, which comprises extracting zein from gluten meal with a zein solvent; coagulating and precipitating denatured protein in the form of a filtrable precipitate; and removing said precipitate from the solution.

15. Process of preparing a zein sodution substantially free from denatured protein, whereby the solution will be stable, which comprises extracting zein from gluten meal with an aqueous alcohol solvent, cooling and ageing the solution to coagulate and precipitate denatured protein in the form of a filtrable precipitate; and removing said precipitate from the solution.

16. Treatment of an alcoholic zein solution to stabilize it which comprises: cooling the solution to a temperature above that at which the solution separates into two liquid phases whereby protein bodies are precipitated which, if allowed to remain in the solution, denaturize soluble zein; and removing such bodies from the solution.

17. Treatment of an alcoholic zein solution to stabilize it which comprises: cooling the solution to a temperature between 20° and 10° C. (68° and 40° F.) to precipitate protein bodies which, if allowed to remain in the solution, denaturize soluble zein; and removing such bodies from the solution.

18. Treatment of an alcoholic zein solution to stabilize it which comprises: cooling the solution to a temperature of about 15° C. (59° F.) to precipitate protein bodies which, if allowed to remain in the solution, denaturize soluble zein; and removing such bodies from the solution.

19. In the production of zein: extracting the zein from corn gluten with an alcoholic solvent and heat; cooling the extract to a temperature which is above that at which the solution separates into two liquid phases; and removing precipitated protein bodies whereby the stability of the solution is increased.

20. In the production of zein: extracting the zein from corn gluten with an alcoholic solvent and the application of heat; cooling the extract to a temperature between 20° C. and 10° C. (68° and 40° F.); and removing precipitated protein bodies whereby the stability of the solution is increased.

LLOYD C. SWALLEN.